United States Patent
Hartman

(10) Patent No.: US 8,330,437 B1
(45) Date of Patent: Dec. 11, 2012

(54) PULSE WIDTH MODULATOR WITH TRANSIENT-BASED ASYNCHRONOUS RESET

(75) Inventor: Mark Hartman, Santa Clara, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 308 days.

(21) Appl. No.: 12/592,937

(22) Filed: Dec. 4, 2009

(51) Int. Cl.
*G05F 1/59* (2006.01)

(52) U.S. Cl. ........................................ 323/271; 323/222

(58) Field of Classification Search ................... 323/222, 323/224, 267, 271–271, 282–288; 327/175, 327/177, 323, 531, 532, 551, 558; 363/16, 363/17, 39, 41, 98
See application file for complete search history.

(56) References Cited

U.S. PATENT DOCUMENTS

| | | | | |
|---|---|---|---|---|
| 5,414,341 A | * | 5/1995 | Brown | 323/268 |
| 5,912,552 A | * | 6/1999 | Tateishi | 323/285 |
| 5,929,692 A | * | 7/1999 | Carsten | 327/531 |
| 6,104,172 A | * | 8/2000 | Josephs et al. | 323/222 |
| 6,198,264 B1 | * | 3/2001 | Nagaya et al. | 323/284 |
| 6,490,183 B2 | * | 12/2002 | Zhang | 363/89 |
| 7,119,524 B2 | * | 10/2006 | Bretz et al. | 323/274 |
| 7,453,246 B2 | | 11/2008 | Qiu et al. | |
| 7,868,600 B2 | * | 1/2011 | Qiu et al. | 323/282 |
| 2010/0127680 A1 | | 5/2010 | Satterfield et al. | |

OTHER PUBLICATIONS

Zhenyu Zhao, et al., "Continuous-Time Digital Signal Processing Based Controller for High-Frequency DC-DC Converters", 2007 IEEE, p. 882-886.

* cited by examiner

*Primary Examiner* — Rajnikant Patel
(74) *Attorney, Agent, or Firm* — Andrew S. Viger; Wade J. Brady, III; Frederick J. Telecky, Jr.

(57) ABSTRACT

An apparatus includes a sawtooth generator configured to generate a sawtooth voltage, where the sawtooth generator is configured to repeatedly reset the sawtooth voltage using a clock signal. The apparatus also includes a pulse width modulation (PWM) generator configured to generate a PWM signal using the sawtooth voltage, the PWM signal comprising multiple PWM pulses, where an output voltage is based on the PWM signal. The apparatus further includes a transient detector configured to detect a transient associated with the output voltage and to cause the sawtooth generator to asynchronously reset the sawtooth voltage in response to the detected transient. The resetting of the sawtooth voltage may cause the sawtooth generator to lengthen one or more of the PWM pulses in the PWM signal and/or generate one or more additional PWM pulses in the PWM signal. This can help to increase a duty cycle of the PWM signal.

16 Claims, 4 Drawing Sheets

PULSE WIDTH MODULATOR WITH TRANSIENT-BASED ASYNCHRONOUS RESET

TECHNICAL FIELD

This disclosure is generally directed to pulse width modulators. More specifically, this disclosure is directed to a pulse width modulator with transient-based asynchronous reset.

BACKGROUND

Many systems use switching power converters to generate regulated voltages for components of the systems. In a buck or step-down converter, the converter generates an output voltage that is lower than its input voltage. In a boost or step-up converter, the converter generates an output voltage that is higher than its input voltage. In a buck-boost converter, the converter generates an output voltage that is lower or higher than its input voltage depending on its mode of operation.

In these types of converters, pulse width modulation (PWM) modulators are often used to convert control signals into duty cycle commands. For example, if a converter needs to decrease its output voltage, the PWM modulator may decrease the duty cycle of the duty cycle command in response to a control signal. If the converter needs to increase its output voltage, the PWM modulator may increase the duty cycle of the duty cycle command in response to a control signal.

A problem in conventional switching power converters is that transients in a regulated voltage can occur, such as loading transients caused by changes in a load that receives the regulated voltage. While a conventional switching power converter can typically operate to counteract loading transients, the converter's reaction time to the loading transients can be quite slow.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

Figure 1A:
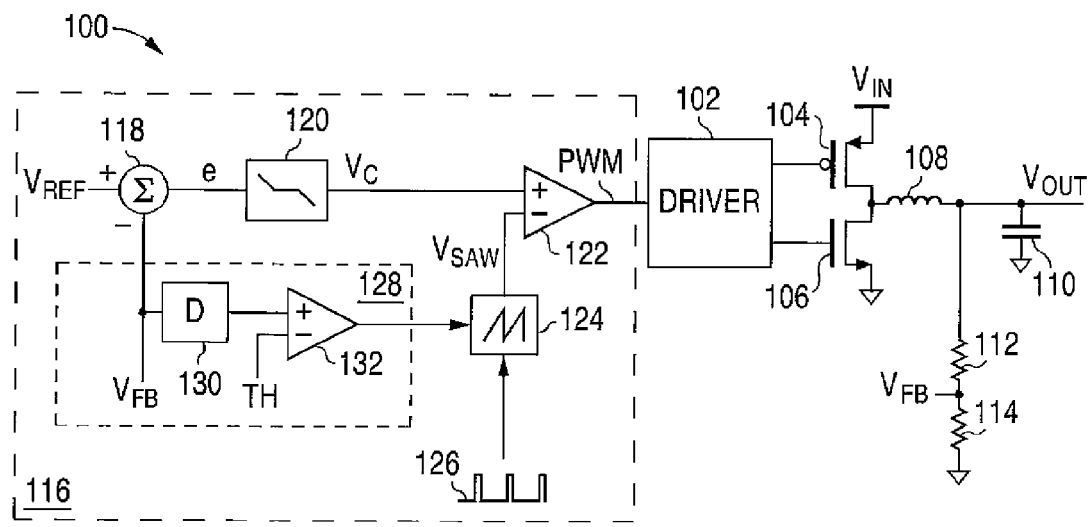
FIGS. 1A and 1B illustrate a first example switching power converter using a PWM modulator with transient-based asynchronous reset according to this disclosure.
Figure 1B:
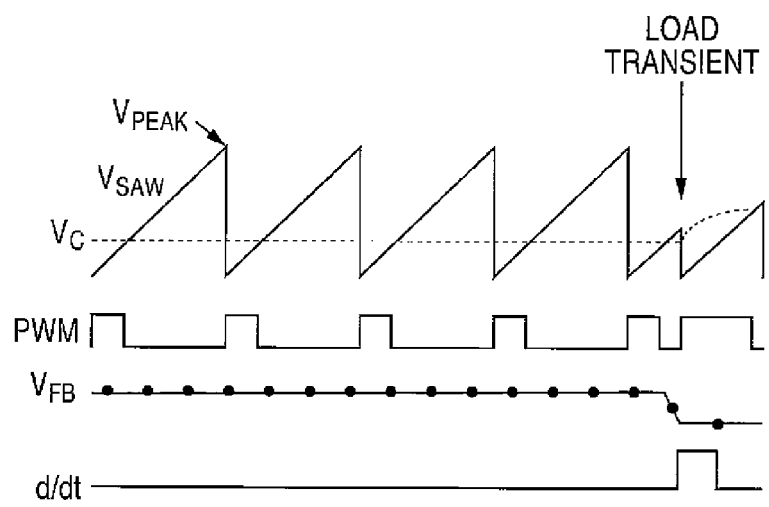

FIGS. 1A and 1B illustrate a first example switching power converter 100 using a PWM modulator with transient-based asynchronous reset according to this disclosure. As shown in FIG. 1A, the converter 100 represents a buck converter, meaning the converter 100 receives an input voltage $V_{IN}$ and generates a lower output voltage $V_{OUT}$. In this example, the converter 100 includes a driver 102, two transistors 104-106, an inductor 108, and a capacitor 110. The driver 102 is coupled to gates of the transistors 104-106. The transistor 104 is coupled to the input voltage $V_{IN}$, transistor 106, and inductor 108. The transistor 106 is coupled to ground, transistor 104, and inductor 108.

The driver 102 generates control signals for the gates of the transistors 104-106, thereby turning the transistors 104-106 on and off. The transistor 104 selectively couples the input voltage $V_{IN}$ to the inductor 108, and the transistor 106 selectively couples the inductor 108 to ground. By turning the transistors 104-106 on and off, the driver 102 can generate and adjust the output voltage $V_{OUT}$. The driver 102 includes any suitable structure for driving one or more transistors. Each of the transistors 104-106 includes any suitable transistor device. The transistor 104 could represent a p-channel metal oxide semiconductor (PMOS) transistor, and the transistor 106 could represent an n-channel metal oxide semiconductor (NMOS) transistor.

The inductor 108 is coupled to the transistors 104-106 and is charged and discharged by the transistors 104-106. The inductor 108 generates the output voltage $V_{OUT}$ that is provided to a load, which represents any circuit or device that operates using a regulated output voltage. The inductor 108 includes any suitable inductive structure having any suitable inductance. The capacitor 110 is coupled to the inductor 108 and helps to filter the output voltage $V_{OUT}$. The capacitor 110 includes any suitable capacitive structure having any suitable capacitance.

Two resistors 112-114 are coupled in series to the inductor 108 and the capacitor 110. The resistors 112-114 form a voltage divider that generates a feedback voltage $V_{FB}$, based on the output voltage $V_{OUT}$. Each of the resistors 112-114 includes any suitable resistive structure having any suitable resistance.

The converter 100 also includes a PWM modulator 116, which generates a PWM signal (a duty cycle command) that is provided to the driver 102. The driver 102 turns the transistors 104-106 on and off based on the PWM signal. In this example, the PWM modulator 116 includes a combiner 118, which subtracts the feedback voltage $V_{FB}$ from a reference voltage $V_{REF}$ to generate an error signal e. The error signal e identifies the difference between the feedback voltage $V_{FB}$ and the reference voltage $V_{REF}$. The combiner 118 includes any suitable structure for combining values.

A compensator 120 uses the error signal e to generate a control voltage $V_C$. The control voltage $V_C$ is used to control the duty cycle of the PWM signal, ideally to reduce or minimize the difference between the feedback voltage $V_{FB}$ and the reference voltage $V_{REF}$. The compensator 120 includes any suitable structure for generating a control signal used to adjust the duty cycle of a PWM signal. The compensator 120 could, for example, include a low-pass filter or a proportional-integral-derivative (PID) controller.

A comparator 122 receives the control voltage $V_C$ and a sawtooth voltage $V_{SAW}$, which is generated by a sawtooth generator 124. The comparator 122 compares the control voltage $V_C$ and the sawtooth voltage $V_{SAW}$ and generates the PWM signal based on the comparison. For example, the output of the comparator 122 could be high when the control voltage $V_C$ exceeds the sawtooth voltage $V_{SAW}$. By adjusting the control voltage $V_C$, it is possible to adjust the length of time that the output of the comparator 122 is high, thereby adjusting the duty cycle of the PWM signal. The comparator 122 includes any suitable structure for comparing input signals.

The sawtooth generator 124 generates the sawtooth voltage $V_{SAW}$, such as by repeatedly generating an increasing ramp voltage until the sawtooth generator 124 is reset. The resetting of the sawtooth generator 124 is periodically done using a clock signal 126, which in this example pulses high at a generally constant switching frequency to reset the sawtooth voltage $V_{SAW}$. The sawtooth generator 124 includes any suitable structure for generating a sawtooth voltage.

During a loading transient, the output voltage $V_{OUT}$ could drop rapidly, causing a drop in the feedback voltage $V_{FB}$ and an increase in the error signal e. The compensator 120 modifies the control voltage $V_C$ in response to the larger error signal e, and the comparator 122 adjusts the PWM signal based on the control voltage $V_C$. The compensator's frequency response reduces its gain at higher frequencies to stabilize the loop, but its transient response improves with higher gain. A compromise is often the result. For very fast load steps with rise times much less than a PWM switching period, the entire load transient can occur within one switching period. At these higher frequencies, the loop gain is typically small, often much less than one. As a result, the control signal $V_C$ responds slowly, and the output voltage $V_{OUT}$ experiences a large undershoot. In addition to a slow loop response, a higher-frequency load step can incur more sampling delay in the PWM modulator. A traditional, linear sawtooth PWM modulator is reset by a fixed frequency clock. Once the clock signal has gone low, it cannot go high until the next clock cycle, no matter how fast $V_C$ changes. This sample delay also contributes to a larger undershoot in the output voltage $V_{OUT}$.

In accordance with this disclosure, the PWM modulator 116 can asynchronously reset the sawtooth voltage $V_{SAW}$ generated by the sawtooth generator 124 upon detecting a transient. This resetting is said to be "asynchronous" because it occurs independently of the clock signal 126 that normally resets the sawtooth generator 124. In these embodiments, the PWM modulator 116 includes a transient detector 128, which operates to detect transients associated with the output voltage $V_{OUT}$.

The asynchronous reset of the PWM modulator's sawtooth voltage $V_{SAW}$ dynamically improves the transient response of the modulator 116. For example, the asynchronous reset can dynamically increase the gain of the entire loop. The modulator gain is expressed as $1/V_{PEAK}$, where $V_{PEAK}$ is the peak voltage of the sawtooth waveform. The asynchronous reset dynamically reduces the value of $V_{PEAK}$ for at least one switching cycle (as shown in FIG. 1B). The asynchronous reset can also dynamically reduce the sample delay of the modulator 116 during a transient. The transient detector 128 can have a much smaller delay than the other components 118-120 in the PWM modulator 116, so the PWM modulator 116 is more quickly reset once a transient is detected, effectively reducing its sample delay.

In some embodiments, the transient detector 128 measures the derivative (rate of change) of the output voltage $V_{OUT}$, either directly or indirectly using the feedback voltage $V_{FB}$. The output voltage's derivative during a severe loading transient may be much larger in magnitude than at other times, so it can be used as an indication of a transient. Using the output voltage's derivative can also inherently filter out other, slower transients, such as settling from overshoot, settling from unloading, and voltage positioning. The filtering of these less severe transients may help the output voltage $V_{OUT}$ to remain substantially glitch-free.

In FIG. 1A, the transient detector 128 includes a derivative unit 130, which computes the derivative of the feedback voltage $V_{FB}$. Since the feedback voltage $V_{FB}$ effectively tracks the output voltage $V_{OUT}$, the output of the derivative unit 130 generally indicates the output voltage's rate of change. A comparator 132 compares the output of the derivative unit 130 to a threshold TH. When the output of the derivative unit 130 exceeds the threshold TH, this indicates that the output voltage $V_{OUT}$ is suffering a large transient. The output of the comparator 132 can reset the sawtooth voltage $V_{SAW}$ asynchronously from the clock signal 126. Resetting the sawtooth voltage $V_{SAW}$ forces the duty cycle of the PWM signal higher, allowing the PWM modulator 116 to more rapidly increase the output voltage $V_{OUT}$ in response to the loading transient. The control voltage $V_C$ remains continuous and eventually controls when the PWM signal goes low again. This allows a feedback loop to smoothly settle to a new equilibrium, avoiding unwanted glitches and oscillations.

The derivative unit 130 includes any suitable structure for determining a derivative of an input signal. The derivative unit 130 could determine any suitable derivative value. For example, in some embodiments, the output of the derivative unit 128 can be expressed as $K_n = K_{n-1} - V_{FB}$, where $K_n$ denotes the current output of the derivative unit 130 and $K_{n-1}$ denotes the preceding output of the derivative unit 130. The comparator 132 includes any suitable structure for comparing inputs. The threshold TH can have any suitable value, such as a value that is low enough to detect loading transients and high enough to filter other transients.

The use of a derivative to detect transients in FIG. 1A is for illustration only. The transient detector 128 could use any other technique for identifying transients in the output voltage $V_{OUT}$. The transient detector 128 includes any suitable structure for detecting transients associated with a voltage.

FIG. 1B shows example waveforms that may be associated with the switching power converter 100 during operation. FIG. 1B shows the sawtooth voltage $V_{SAW}$ and the control voltage $V_C$, and the PWM signal is high when the control voltage $V_C$ exceeds the sawtooth voltage $V_{SAW}$. When the sawtooth voltage $V_{SAW}$ exceeds the control voltage $V_C$, the PWM signal goes low. For most of the time in FIG. 1B, no loading transients occur, the control voltage $V_C$ and the feedback voltage $V_{FB}$ remain generally constant, and the output of the comparator 132 (denoted d/dt) remains low. Eventually, a loading transient occurs, which causes an increase in the control voltage $V_C$. This loading transient is also detected by the transient detector 128, and the comparator 132 outputs a high pulse that resets the sawtooth voltage $V_{SAW}$. This causes the sawtooth voltage $V_{SAW}$ to have a lower peak $V_{PEAK}$ during at least one PWM cycle, which increases the gain of the loop in the PWM modulator 116. This also reduces the sample delay of the PWM modulator 116. Because the sawtooth voltage $V_{SAW}$ is reset to a lower voltage and the control voltage $V_C$ has increased, the PWM signal goes high for a longer period of time, and it does so much faster than conventional switching power converters. This allows the switching power converter 100 to recover from the loading transient more quickly.

Although FIGS. 1A and 1B illustrate a first example switching power converter 100 using a PWM modulator with transient-based asynchronous reset, various changes may be made to FIGS. 1A and 1B. For example, various components in FIG. 1A could be combined, omitted, or further subdivided and additional components could be added according to particular needs. Also, any other suitable transient detector 128 could be used in the converter 100. In addition, the waveforms shown in FIG. 1B are for illustration only to demonstrate possible operations that might occur in response to a specific loading transient.

Figure 2:
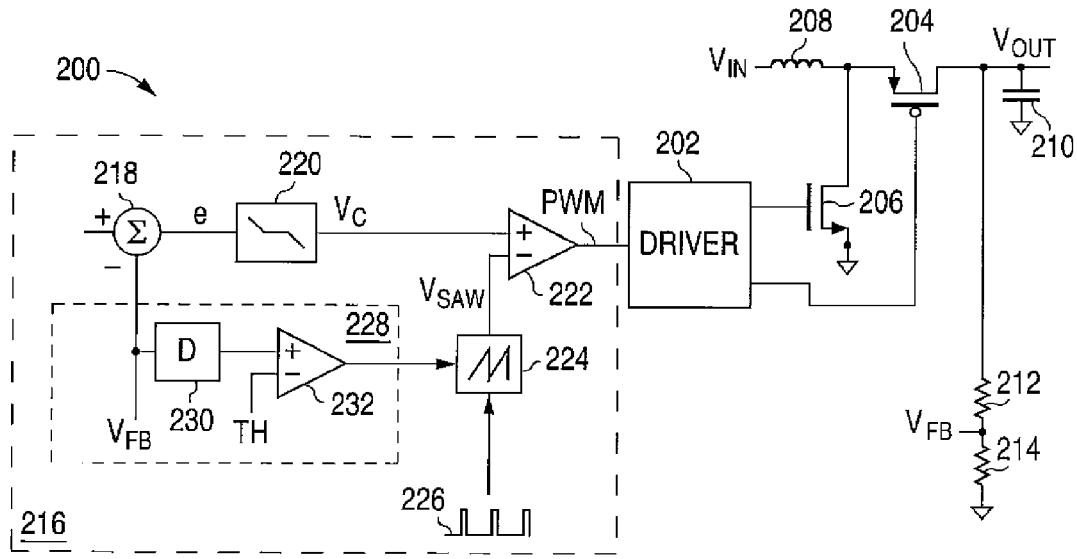
FIG. 2 illustrates a second example switching power converter using a PWM modulator with transient-based asynchronous reset according to this disclosure.

FIG. 2 illustrates a second example switching power converter 200 using a PWM modulator with transient-based asynchronous reset according to this disclosure. As shown in FIG. 2, the converter 200 represents a boost converter, meaning the converter 200 receives an input voltage $V_{IN}$ and generates a higher output voltage $V_{OUT}$. In this example, the converter 200 includes a driver 202, two transistors 204-206, an inductor 208, and a capacitor 210. The driver 202 turns the transistors 204-206 on and off. The transistor 204 selectively couples the inductor 208 (which is coupled to the input voltage $V_{IN}$) to an output where the output voltage $V_{OUT}$ is provided. The transistor 206 selectively couples the inductor 208 to ground. By turning the transistors 204-206 on and off, the driver 202 can generate and adjust the output voltage $V_{OUT}$. The capacitor 210 helps to filter the output voltage $V_{OUT}$.

The driver 202 includes any suitable structure for driving one or more transistors. Each of the transistors 204-206 includes any suitable transistor device, such as a PMOS transistor and an NMOS transistor, respectively. The inductor 208 includes any suitable inductive structure having any suitable inductance. The capacitor 210 includes any suitable capacitive structure having any suitable capacitance. Two resistors 212-214 are coupled in series to the transistor 204 and the capacitor 210, forming a voltage divider. Each of the resistors 212-214 includes any suitable resistive structure having any suitable resistance.

In this example, the converter 200 also includes a PWM modulator 216, which can operate in the same or similar manner as the PWM modulator 116 of FIG. 1A. A combiner 218 combines a feedback voltage $V_{FB}$ and a reference voltage $V_{REF}$ to generate an error signal e, and a compensator 220 uses the error signal e to generate a control voltage $V_C$. A comparator 222 compares the control voltage $V_C$ to a sawtooth voltage $V_{SAW}$ to generate a PWM signal. A sawtooth generator 224 generates the sawtooth voltage $V_{SAW}$ and can be reset by a clock signal 226 or by a transient detector 228. In this example embodiment, the transient detector 228 includes a derivative unit 230 and a comparator 232. The transient detector 228 resets the sawtooth voltage $V_{SAW}$ in response to detecting a loading transient.

Although FIG. 2 illustrates a second example switching power converter 200 using a PWM modulator with transient-based asynchronous reset, various changes may be made to FIG. 2. For example, various components in FIG. 2 could be combined, omitted, or further subdivided and additional components could be added according to particular needs. Also, any other suitable transient detector 228 could be used in the converter 200. In addition, various components in FIGS. 1A and 2 could be combined to form a buck-boost switching power converter. For instance, the left side of the inductor 206 in FIG. 2 could be connected between the transistors 104-106 from FIG. 1A. The transistor 204 could be turned on, the transistor 206 could be turned off, and the transistors 104-106 could be driven to operate the converter in buck mode. Also, the transistor 104 could be turned on, the transistor 106 could be turned off, and the transistors 204-206 could be driven to operate the converter in boost mode.

Figure 3A:
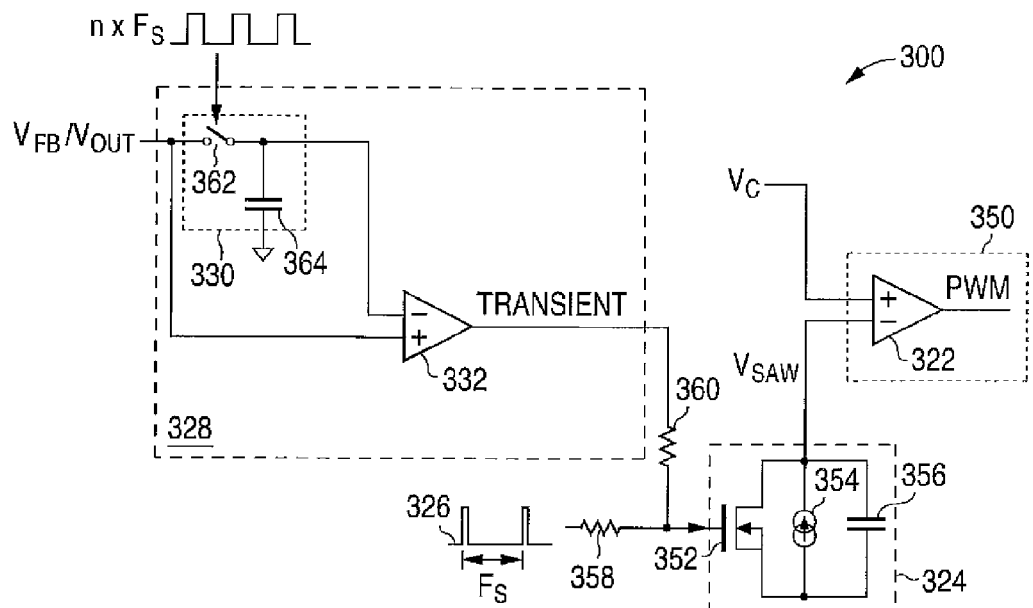
FIGS. 3A and 3B illustrate a specific implementation of a PWM modulator with transient-based asynchronous reset according to this disclosure.
Figure 3B:
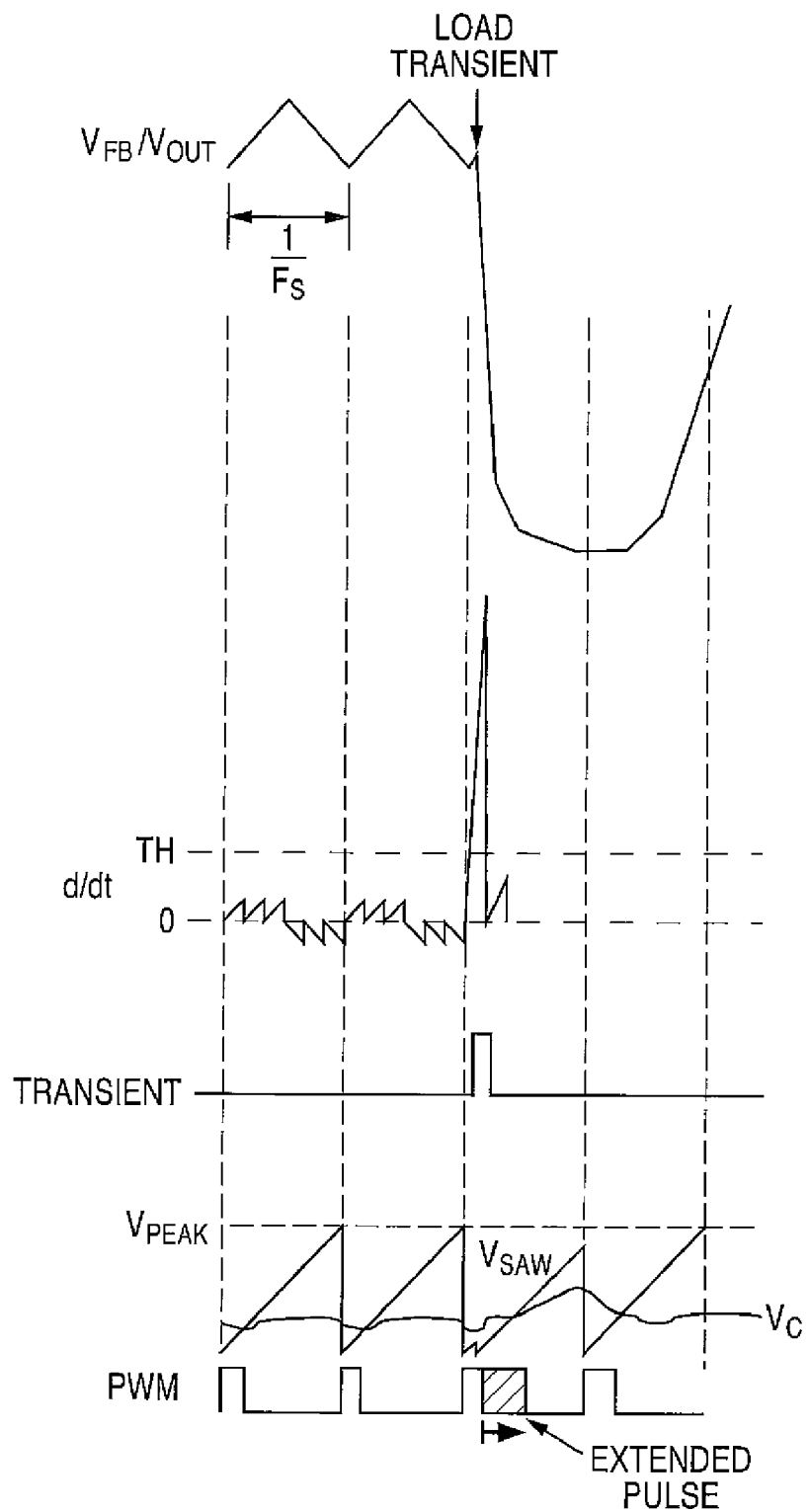

FIGS. 3A and 3B illustrate a specific implementation of a PWM modulator 300 with transient-based asynchronous reset according to this disclosure. The PWM modulator 300 could, for example, be used as the PWM modulator in FIG. 1A, in FIG. 2, in a buck-boost converter, or in any other suitable converter.

As shown in FIG. 3A, the PWM modulator 300 includes a PWM generator 350 having a comparator 322, which compares a control voltage $V_C$ to a sawtooth voltage V. The sawtooth voltage $V_{SAW}$ is generated by a sawtooth generator 324, which in this example includes a transistor 352, a current source 354, and a capacitor 356 coupled in parallel. The current source 354 causes current to flow to the capacitor 356, charging the capacitor 356 and creating a voltage ramp up. The transistor 352 is turned on to short and discharge the capacitor 356, creating the voltage drop. The transistor 352 is turned on by a voltage generated across a resistor 358 by a clock signal 326 or a voltage generated across a resistor 360 by a transient detector 328. The clock signal 326 has a switching frequency $F_S$.

The transient detector 328 in this example includes a derivative unit 330 and a comparator 332. Here, the derivative unit 330 includes a switch 362 (such as a transistor) and a capacitor 364. The switch 362 operates at a frequency higher than the frequency $F_S$, such as six times higher. The switch 362 opens and closes to couple an output voltage $V_{OUT}$ or a feedback voltage $V_{FB}$ to the capacitor 364, which charges or discharges the capacitor 364 based on the output voltage $V_{OUT}$ or the feedback voltage $V_{FB}$.

The voltage on the capacitor 364 is provided to one input of the comparator 332, and the output voltage $V_{OUT}$ or the feedback voltage $V_{FB}$ is provided to another input of the comparator 332. A voltage difference across the inputs of the comparator 332 represents the derivative of the output voltage $V_{OUT}$ or the feedback voltage $V_{FB}$. Hysteresis is used in the comparator 332, which requires the voltage on the capacitor 364 to differ by at least some minimum amount compared to the output voltage $V_{OUT}$ or the feedback voltage $V_{FB}$ before the comparator 332 is tripped. Effectively, the hysteresis acts as a threshold for determining when the derivative of the output voltage $V_{OUT}$ or the feedback voltage $V_{FB}$ is too high.

FIG. 3B shows example waveforms that may be associated with the PWM modulator 300 during operation. As shown in FIG. 3B, the output voltage $V_{OUT}$ or the feedback voltage $V_{FB}$ oscillates up and down with a regular switching period $1/F_S$. During this time, the sawtooth voltage $V_{SAW}$ generally increases to its peak voltage $V_{PEAK}$ before being reset by the PWM signal. At some point, a loading transient causes the output voltage $V_{OUT}$ or the feedback voltage $V_{FB}$ to drop significantly. The derivative of the output voltage $V_{OUT}$ or the feedback voltage $V_{FB}$ (denoted d/dt) increases rapidly and exceeds a threshold TH, and the output of the comparator 332 (denoted TRANSIENT) goes high when the derivative exceeds the threshold TH. This resets the sawtooth voltage $V_{SAW}$, which in this example occurs long before the sawtooth voltage $V_{SAW}$ nears its peak voltage $V_{PEAK}$. This increases the gain of the loop in the PWM modulator 300 and reduces the sample delay of the PWM modulator 300. In this example, the resetting of the sawtooth voltage $V_{SAW}$ extends the duration of a PWM pulse in the PWM signal. Note, however, that if the loading transient had occurred slightly later, the current PWM pulse may actually end, and the resetting of the sawtooth voltage $V_{SAW}$ could cause an additional PWM pulse to occur (rather than causing an extension of the current PWM pulse).

Although FIGS. 3A and 3B illustrate a specific implementation of a PWM modulator 300 with transient-based asynchronous reset, various changes may be made to FIGS. 3A and 3B. For example, the sawtooth generator 324 and the transient detector 328 could each be implemented in any other suitable manner. Also, the waveforms shown in FIG. 3B are for illustration only to demonstrate possible operations that might occur in response to a specific loading transient.

Figure 4:
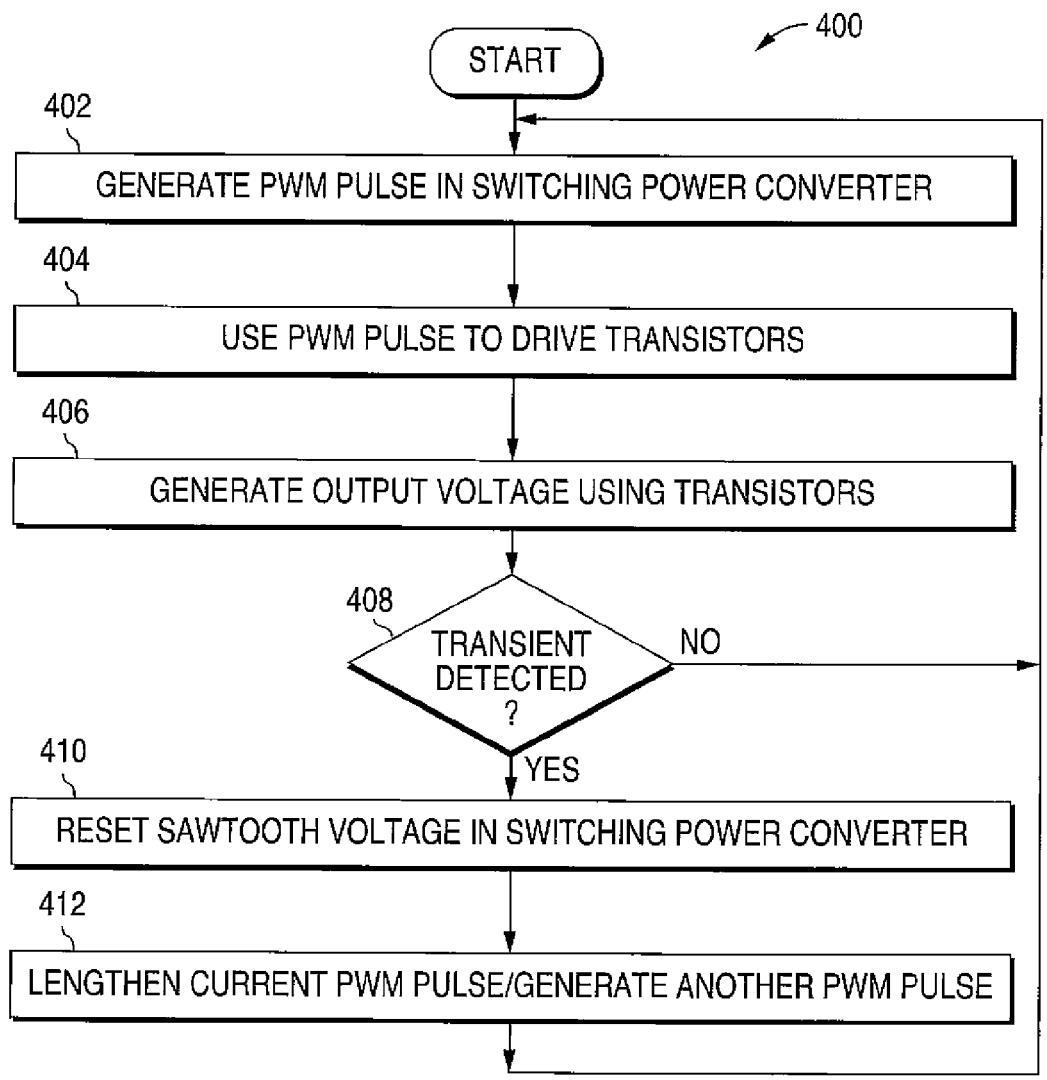
FIG. 4 illustrates an example method for switching power conversion using a PWM modulator with transient-based asynchronous reset according to this disclosure.

FIG. 4 illustrates an example method 400 for switching power conversion using a PWM modulator with transient-based asynchronous reset according to this disclosure. For ease of explanation, the method 400 is described with respect to the switching power converter 100 of FIG. 1A. The method 400 could be used with any other suitable switching power converter, such as the switching power converter 200 of FIG. 2.

As shown in FIG. 4, a PWM pulse is generated in a switching power converter at step 402. This could include, for example, the combiner 118, compensator 120, and comparator 122 operating to generate a PWM pulse in a PWM signal. The PWM pulse is used to drive transistors at step 404, which generates an output voltage of the switching power converter at step 406. This could include, for example, the driver 102 using the PWM pulse to drive the transistors 104-106.

If no loading transients are detected at step 408, the method 400 returns to step 402 to generate another PWM pulse. A loading transient could be detected in any suitable manner, such as by using a derivative of the output voltage $V_{OUT}$ or another voltage based on the output voltage $V_{OUT}$ (like the feedback voltage $V_{FB}$).

If a loading transient is detected at step 408, a sawtooth voltage used in the switching power converter is reset at step 410. This could include, for example, the comparator 132 tripping and outputting a signal that resets the sawtooth generator 124. This increases the gain of the loop in the PWM modulator and reduces the sample delay of the PWM modulator. The length of the current PWM pulse is increased or an additional PWM pulse is created in the PWM signal at step 412. This could include, for example, the comparator 122 outputting a longer PWM pulse in the PWM signal or outputting an additional PWM pulse in the PWM signal. The method 400 then returns to step 402 to generate the next PWM pulse, which may or may not be lengthened.

Although FIG. 4 illustrates an example method 400 for switching power conversion using a PWM modulator with transient-based asynchronous reset, various changes may be made to FIG. 4. For example, while shown as a series of steps, various steps in FIG. 4 could overlap or occur in parallel.

It may be advantageous to set forth definitions of certain words and phrases that have been used within this patent document. The term "couple" and its derivatives refer to any direct or indirect communication between two or more components, whether or not those components are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
    generating a sawtooth voltage, the sawtooth voltage repeatedly reset using a clock signal;
    generating a pulse width modulation (PWM) signal using the sawtooth voltage, the PWM signal comprising multiple PWM pulses;
    generating an output voltage based on the PWM signal;
    determining a derivative of the output voltage or a feedback voltage based on the output voltage; and
    asynchronously resetting the sawtooth voltage in response to the determined derivative exceeding a threshold defining a detected transient associated with the output voltage.

2. The method of claim 1, wherein, based on asynchronously resetting the sawtooth voltage, the method further comprises at least one of:
    lengthening one or more of the PWM pulses in the PWM signal; and
    generating one or more additional PWM pulses in the PWM signal.

3. The method of claim 2, wherein generating the PWM signal comprises comparing a control voltage to the sawtooth voltage, the PWM signal pulsing when the control voltage exceeds the sawtooth voltage.

4. The method of claim 1, wherein generating the PWM signal comprises:
    generating an error signal using the feedback voltage and a reference voltage;
    generating a control voltage based on the error signal; and
    comparing the control voltage and the sawtooth voltage to generate the PWM signal.

5. The method of claim 1, wherein asynchronously resetting the sawtooth voltage increases a duty cycle of the PWM signal.

6. An apparatus comprising:
    a sawtooth generator configured to generate a sawtooth voltage, the sawtooth generator configured to repeatedly reset the sawtooth voltage using a clock signal;
    a pulse width modulation (PWM) generator configured to generate a PWM signal using the sawtooth voltage, the PWM signal comprising multiple PWM pulses, wherein an output voltage is based on the PWM signal; and
    a transient detector configured to determine a derivative of the output voltage or a feedback voltage based on the output voltage and to cause the sawtooth generator to asynchronously reset the sawtooth voltage in response to the determined derivative exceeding a threshold defining a detected transient associated with the output voltage.

7. The apparatus of claim 6, wherein the transient detector is configured to cause the sawtooth generator to asynchronously reset the sawtooth voltage in order to cause the sawtooth generator to at least one of:
    lengthen one or more of the PWM pulses in the PWM signal; and
    generate one or more additional PWM pulses in the PWM signal.

8. The apparatus of claim 6, wherein the PWM generator comprises a comparator configured to compare a control voltage to the sawtooth voltage, the PWM signal pulsing when the control voltage exceeds the sawtooth voltage.

9. The apparatus of claim 6, wherein the transient detector comprises:
   A comparator
   a capacitor coupled to a first input of the comparator; and
   a switch configured to repeatedly couple and uncouple the output voltage or the feedback voltage to and from the capacitor;
   wherein a second input of the comparator is configured to receive the output voltage or the feedback voltage;
   such that the voltage difference between the first and second inputs corresponds to the derivative of the feedback voltage.

10. The apparatus of claim 6, further comprising:
   a combiner configured to generate an error signal using the feedback voltage and a reference voltage;
   a compensator configured to generate a control voltage based on the error signal; and
   a comparator configured to compare the control voltage and the sawtooth voltage to generate the PWM signal.

11. The apparatus of claim 6, wherein the sawtooth generator comprises a transistor, a current source, and a capacitor coupled in parallel, the transistor having a gate coupled to the transient detector.

12. A system comprising:
   multiple transistors coupled to an inductor;
   a pulse width modulation (PWM) modulator configured to generate a PWM signal; and
   a driver configured to drive the transistors based on the PWM signal in order to generate an output voltage;
   wherein the PWM modulator comprises:
      a sawtooth generator configured to generate a sawtooth voltage, the sawtooth generator configured to repeatedly reset the sawtooth voltage using a clock signal;
      a PWM generator configured to generate the PWM signal using the sawtooth voltage, the PWM signal comprising multiple PWM pulses; and
      a transient detector configured to determine a derivative of the output voltage or a feedback voltage based on the output voltage and to cause the sawtooth generator to asynchronously reset the sawtooth voltage in response to the determined derivative exceeding a threshold defining a detected transient associated with the output voltage.

13. The system of claim 12, wherein the transient detector is configured to cause the sawtooth generator to asynchronously reset the sawtooth voltage in order to cause the sawtooth generator to at least one of:
   lengthen one or more of the PWM pulses in the PWM signal; and
   generate one or more additional PWM pulses in the PWM signal.

14. The system of claim 12, wherein the derivative unit comprises:
   a capacitor coupled to a first input of the comparator; and
   a switch configured to repeatedly couple and uncouple the feedback voltage to and from the capacitor;
   wherein a second input of the comparator is configured to receive the feedback voltage.

15. The system of claim 12, wherein the PWM modulator further comprises:
   a combiner configured to generate an error signal using the feedback voltage and a reference voltage;
   a compensator configured to generate a control voltage based on the error signal; and
   a comparator configured to compare the control voltage and the sawtooth voltage to generate the PWM signal.

16. The system of claim 12, wherein the transient detector is configured to cause the sawtooth generator to asynchronously reset the sawtooth voltage to increase a duty cycle of the PWM signal.

\* \* \* \* \*